United States Patent [19]

Martig, Jr.

[11] 4,081,998

[45] Apr. 4, 1978

[54] FLOW STILLING DEVICE

[75] Inventor: Kenneth W. Martig, Jr., Olympia, Wash.

[73] Assignee: Pro-Tech, Inc., Paoli, Pa.

[21] Appl. No.: 804,542

[22] Filed: Jun. 8, 1977

[51] Int. Cl.² ............................................. G01F 23/14
[52] U.S. Cl. ...................................................... 73/302
[58] Field of Search ................... 73/421 R, 421 B, 302

[56] References Cited

U.S. PATENT DOCUMENTS 1,927,758  9/1933  Scheel et al. ........................... 73/302

Primary Examiner—S. Clement Swisher

Attorney, Agent, or Firm—Charles A. McClure

[57] ABSTRACT

A stilling device, especially useful in large water or sewer pipes or conduits having overhead access openings, is provided in tubular T-shape. The base of the T conveniently comprises a plurality of telescoping sections adapted to be secured together at given extended length. Openings through one side of the T base in a direction perpendicular to the plane of the T facilitate equalization of liquid level inside with the surrounding level when immersed in a water or sewer pipe or conduit. The cross-bar of the T aids retention of the stilling device in place.

12 Claims, 8 Drawing Figures

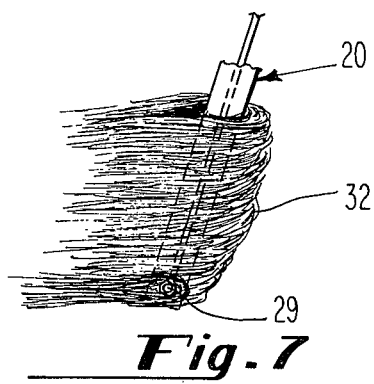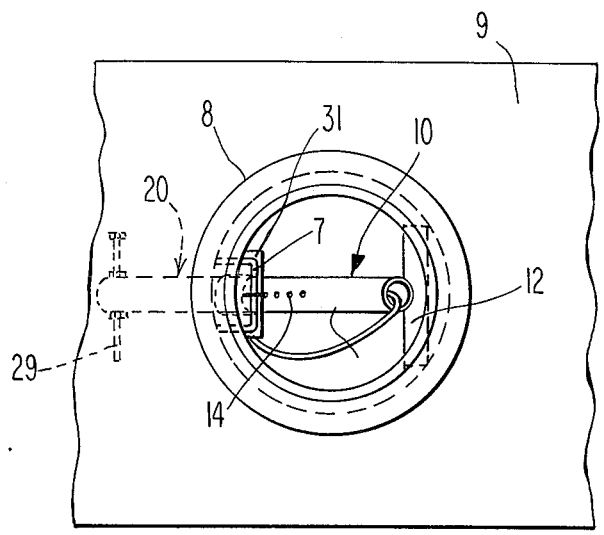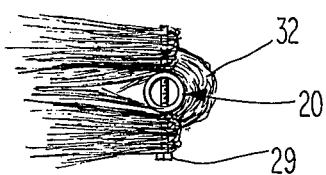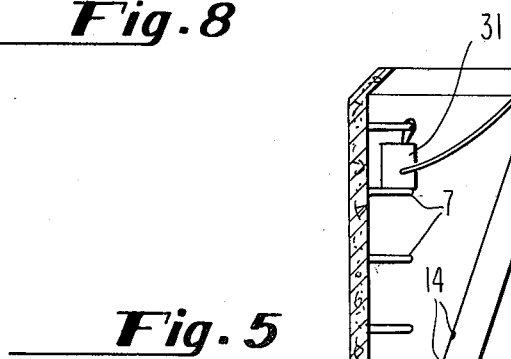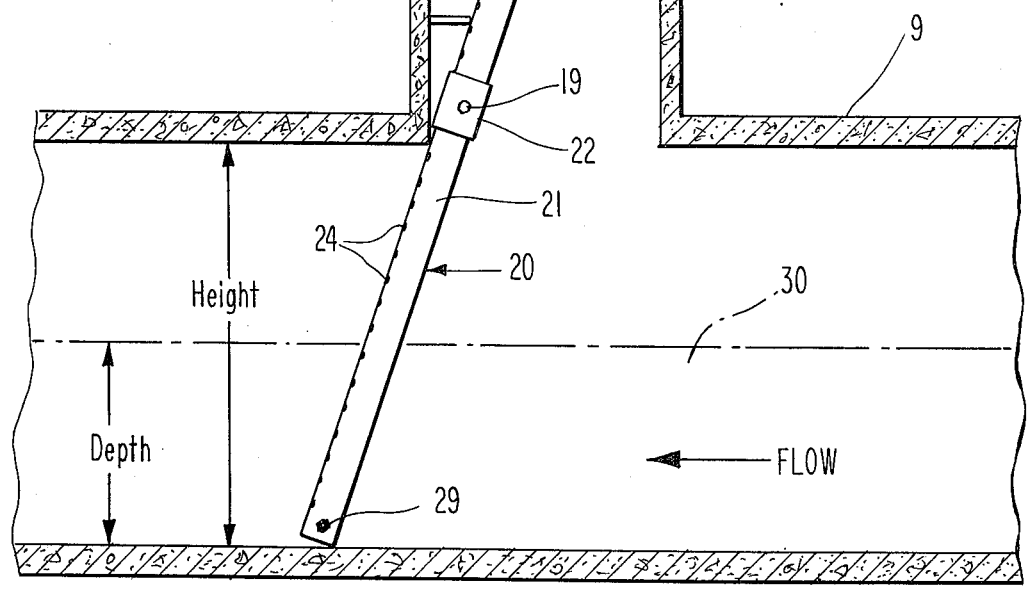

1

FLOW STILLING DEVICE

This invention relates to a stilling device especially useful in large water or sewer pipes or conduits having sufficient flow therein to render it unsafe to venture further than an overhead access opening thereinto, as for the purpose of sampling the flowing liquid or measuring its flow rate.

Installation of an intake for a liquid sampler or of an outlet for a bubbler type of flow monitor, for example, is relatively simple in open water or sewer pipes or conduits up to about a meter in diameter, as by access thereinto from one end or above through a manhole or a chimney-like opening. Larger sizes, however, pose problems of personal safety and accidental loss of equipment downstream. Localized stilling of the flow would be helpful but is difficult to attain.

A primary object of the present invention is localized stilling of liquid flow in an open water or sewer pipe or conduit of large size.

Another object of this invention is to facilitate liquid sampling and/or flow measurement in such pipes or conduits.

A further object of the invention is provision of readily portable apparatus for accomplishing the foregoing objects.

Other objects of the present invention, together with means and methods for attaining the various objects, will be apparent from the following description and the accompanying diagrams of a preferred embodiment thereof, which is presented by way of example rather than limitation.

FIG. 5 is a view, partly in side sectional elevation, showing the stilling device, with extension, in place for use;

FIG. 6 is a top plan corresponding to FIG. 5;

FIG. 7 is an enlarged view of the lower end of the extension piece showing debris buildup thereon; and FIG. 8 is a bottom plan corresponding to FIG. 7.

In general, the objects of the present invention are accomplished, in a stilling device for use in an open water or sewer pipe or conduit, by means of a tubular member and a cross-piece affixed thereto at one end thereof, the tubular member being open at the ends and having openings at intervals therebetween.

The invention extends to apparatus for monitoring liquid depth or flow in a sewer or water pipe or conduit having a chimney-like structure communicating therewith from above, including a bubble tube adapted to extend into the pipe or conduit and below the surface of liquid therein, means for injecting bubble fluid into the bubble tube to bubble therefrom into the liquid, and means operatively connected to the bubble tube for measuring the pressure of the overlying liquid, being specially augmented by a T-shaped stilling device having a cross-bar fitting transversely within the chimney-like structure and having a base leg affixed to and extending from the crossbar a distance exceeding the vertical inside dimension of the pipe or conduit by less than the vertical extent of the chimney-like structure and adapted to receive the bubble tube throughout substantially its entire length.

Figure 2:
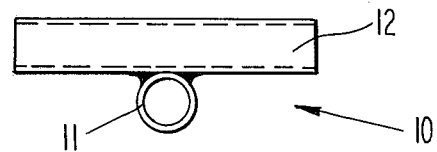
FIG. 2 is a top plan of the device of FIG. 1.
Figure 1:
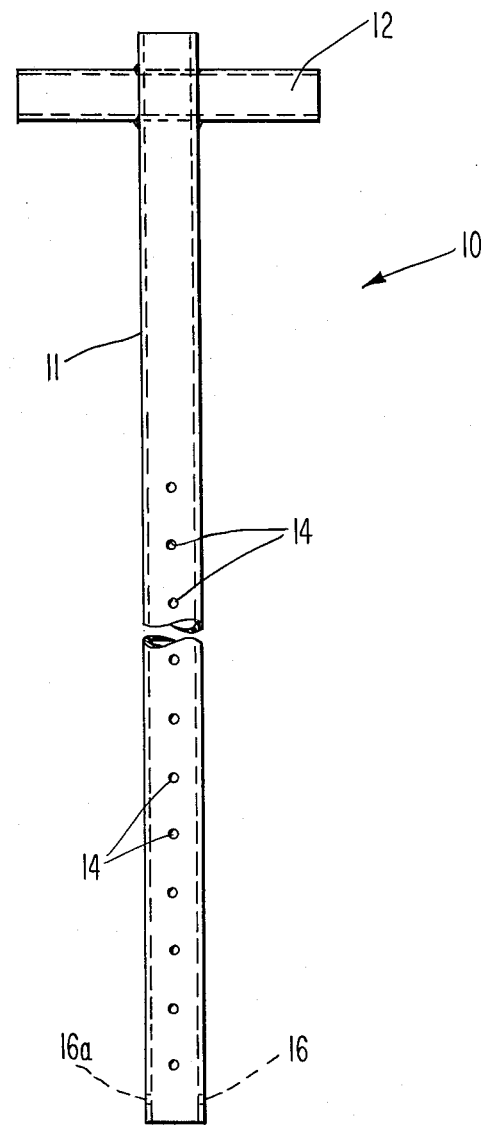
FIG. 1 is a front elevation of a tubular stilling device according to this invention.

FIGS. 1 and 2 show in front elevation and top plan, respectively, T-shaped stilling device 10 comprising tubular base leg 11 and cross-piece 12, which may be tubular or in bar form, affixed together. The near wall (only) of the tubular member in FIG. 1 has openings 14 therethrough spaced at intervals therealong for about the lower half thereof, such openings extending perpendicular to the plane of the T. Near the bottom of the tubular member are a pair of bolt holes 16, 16a extending transversely through both sidewalls thereof in a direction parallel to the cross-piece.

Figure 4:
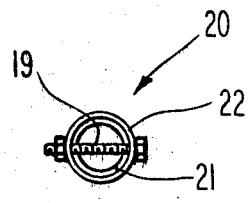
FIG. 4 is a plan of the extension piece of FIG. 3.
Figure 3:
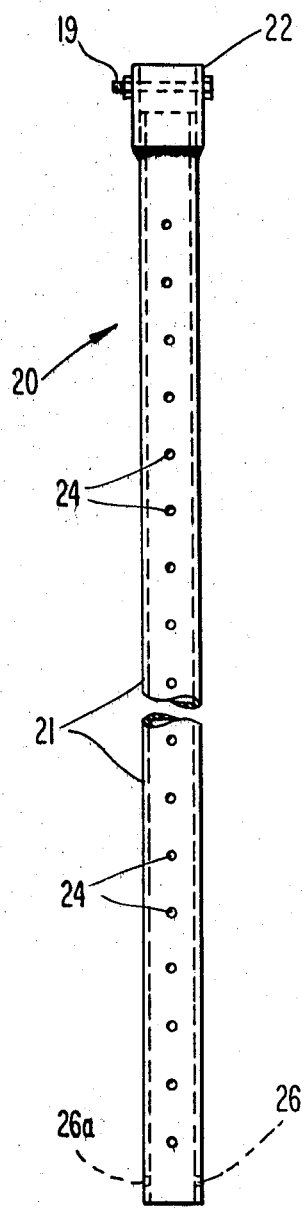
FIG. 3 is a front elevation of an extension piece for the device of the preceding views.

FIGS. 3 and 4 show in like manner extension piece 20 including tubular extension member 21 similar throughout to the lower half of the base leg previously illustrated and junction sleeve 22 affixed to the top end thereof, with bolt 19 extending removably therethrough in a transverse direction. It will be apparent that removal of the bolt enables insertion of the bottom end of base leg 11 into the sleeve and alignment of transverse bolt holes 16, 16a therein to receive bolt 19 and thereby be combined into an extended T-base. The tubular extension member has similar transverse bolt holes 26, 26a near the bottom thereof, as well as spaced openings 24 perpendicular thereto through the near wall only.

FIGS. 5 and 6 show in side sectional elevation and top plan, respectively, an open water or sewer pipe or conduit with the stilling device of this invention in place for use therein, together with related apparatus. Large pipe or conduit 9 has overhead chimney-like access 8 similar to a manhole. A T-shaped stilling device of this invention therein includes cross-piece 12 resting against the inside wall of the access chimney at the right and base leg 11 extending obliquely downward to the left therein and conjoined extension piece 20 with junction sleeve 22 at about the lower left inside corner of the access chimney, the tubular extension member extending further obliquely to rest at its bottom end on the invert or floor of the pipe or conduit at the left side of the view. Transverse bolt 29 is present through the extension piece near its bottom end (via bolt holes 26, 26a visible in FIG. 3). It will be apparent that the stilling device is resting in a stable position to withstand the liquid flow (indicated by an arrow directed leftward) at any given "Depth."

Also present in FIGS. 5 and 6 is related apparatus including housing 31 resting on one rung 7 of the access chimney (and tied to the rung above) and tubing extending therefrom into the top end of tubular base leg 11, therethrough, and into and through tubular extension member 21 to nearly the bottom end thereof, where it may rest at its end upon or be secured to transverse bolt 29. Such apparatus may be a liquid sampler and sample intake line extending within the stilling device into liquid 30. Alternatively, such apparatus may be a depth or flow monitor with bubble tube into the liquid. Both types of apparatus may be present simultaneously with their tubing extending into the liquid via the stilling device. In any event such apparatus operates in conventional manner but with the added safeguard that the stilling device protects against the force of the liquid flow, which otherwise might rupture the tubing and possibly dislodge the apparatus housing from its support by pulling forcibly on the tubing.

FIGS. 7 and 8 show from the side and bottom, respectively, buildup 32 of debris against the upstream side of the lower part of extension member 21. The debris is forced toward the bottom end of the obliquely oriented member by the liquid flow and collects against transverse bolt 29 therethrough. The bolt aids in retaining the debris, which may be removed manually therefrom after lifting the stilling device out of the liquid.

It will be apparent that cross-piece 12 should be shorter than the minimum transverse extent of chimney 8 and that the tubular base leg plus extension member (if necessary) should exceed the vertical inside dimension or "Height" of pipe or conduit (by less than the vertical extent of the chimney) so as to fit comfortably therein as intended. Of course, the extra length required by the oblique orientation of the tubular portion is readily ascertainable by measurement of actual dimensions in any given setting.

The stilling device is conveniently fabricated of fiberglass-reinforced epoxy or similar structurally strong material, preferably also similarly light and resiliently flexible rather than brittle. The bolts (and nuts) are preferably stainless steel or the like. The downstream openings aid in equalizing the liquid level within and outside the tubular member more rapidly than through the bottom opening only and also provide ready interchange with the flowing liquid as is desirable when sampling from therewithin.

Nothwithstanding the showing of an extended stilling device, in FIGS. 5 and 6, composed of conjoined basic T-portion 10 and extension member 20, it will be understood that pipes or conduits of lesser height may require only the basic T-member alone or in conjunction with a similar but shorter extension member. Contrariwise, more than one extension member may be joined in like manner to extend the length further for use in larger pipes or conduits.

Although a certain embodiment has been described and illustrated, modifications may be therein as by adding, combining, or subdividing parts or steps, or by substituting equivalents, while retaining advantages and benefits of this invention, which itself is defined in the following claims.

The claimed invention is:

1. Stilling device for use in an open water or sewer pipe or conduit, comprising a T-shaped structure having a cross-bar and having also an open-ended tubular base leg affixed to and extending from the cross-bar a distance exceeding the vertical inside dimension of the pipe or conduit.

2. Stilling device according to claim 1, wherein the tubular base leg comprises a plurality of tubular lengths telescoping together and separable from one another.

3. Stilling device according to claim 1, wherein the tubular base leg has openings therethrough.

4. Stilling device according to claim 1, wherein the sewer or water pipe has a chimney-like structure communicating therewith from above and wherein the cross-bar of the T-shaped structure is shorter than the minimum horizontal extent of the chimney-like structure.

5. Apparatus for monitoring liquid depth or flow in an open water or sewer pipe or conduit having a chimney-like structure communicating therewith from above, comprising a stilling device according to claim 4, a bubble tube adapted to extend into and within substantially the entire length of the base leg of the stilling device, means for injecting bubble fluid into the bubble tube, and means operatively connected to the bubble tube for measuring the pressure required to bubble fluid from the end thereof within the stilling device when inserted into liquid in the pipe or conduit.

6. In apparatus for monitoring liquid depth or flow in a sewer or water pipe or conduit having a chimney-like structure communicating therewith from above, including a bubble tube adapted to extend into the pipe or conduit and below the surface of liquid therein, means for injecting bubble flow into the bubble tube to bubble therefrom into the liquid, and means operatively connected to the bubble tube for measuring the pressure of the overlying liquid, the improvement comprising a T-shaped stilling device having a cross-bar fitting transversely within the chimney-like structure and having a base leg affixed to and extending from the cross-bar a distance exceeding the vertical inside dimension of the pipe or conduit by less than the vertical extent of the chimney-like structure and adapted to receive the bubble tube throughout substantially it entire length.

7. Liquid depth or flow monitoring apparatus according to claim 6, wherein the base leg of the stilling device has a plurality of openings therethrough in a direction essentially perpendicular to the plane of the T.

8. Liquid depth or flow monitoring apparatus according to claim 7, wherein the base leg has near the immersible end thereof a pair of bolt holes therethrough aligned in a direction essentially parallel to the cross-bar.

9. Liquid depth or flow monitoring apparatus according to claim 8, including a bolt or like member extending transversely therethrough and protruding therefrom as a debris retainer.

10. Stilling device for use in an open water or sewer pipe or conduit, comprising a tubular member and a cross-piece affixed thereto at one end thereof, the tubular member being open at the ends and having openings at intervals therebetween.

11. Stilling device according to claim 10, wherein the intervening openings extend perpendicular to the plane of the tubular member and the affixed cross-piece and through the wall of the tubular member at only one side of the longitudinal axis of the member.

12. Stilling device according to claim 10, including a tubular extension piece and means for connecting the extension piece to the first mentioned tubular member and in axial alignment therewith.

* * * * *